US012158730B2

(12) United States Patent
Nagahama et al.

(10) Patent No.: US 12,158,730 B2
(45) Date of Patent: Dec. 3, 2024

(54) MOVEMENT AND ELECTRONIC WATCH

(71) Applicant: Seiko Epson Corporation, Tokyo (JP)

(72) Inventors: Reiko Nagahama, Shiojiri (JP); Tomoki Okuhata, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 547 days.

(21) Appl. No.: 17/470,024

(22) Filed: Sep. 9, 2021

(65) Prior Publication Data

US 2022/0075324 A1 Mar. 10, 2022

(30) Foreign Application Priority Data

Sep. 10, 2020 (JP) ................................. 2020-151884

(51) Int. Cl.
*G04C 3/14* (2006.01)

(52) U.S. Cl.
CPC ............... *G04C 3/14* (2013.01); *G04C 3/143* (2013.01)

(58) Field of Classification Search
CPC .................................. G04C 3/14; G04C 3/143
See application file for complete search history.

(56) References Cited

U.S. PATENT DOCUMENTS 4,817,063 A * 3/1989 Kawaguchi ............ G04C 10/00 368/204
10,331,084 B2 * 6/2019 Iri ............................ G04C 3/14
2016/0139569 A1 5/2016 Yamamoto et al.
2017/0366123 A1 * 12/2017 Saw .......................... H02P 8/14
2017/0371302 A1 * 12/2017 Morohoshi .......... G04G 9/0076
2018/0120773 A1 * 5/2018 Hasegawa .............. G04C 17/00
2019/0079461 A1 * 3/2019 Maruyama ............. G04B 19/04
2019/0302698 A1 10/2019 Kawaguchi
2020/0036309 A1 1/2020 Nagahama et al.

FOREIGN PATENT DOCUMENTS

JP 2016-102780 A 6/2016
JP 2019-176705 A 10/2019
JP 2020-016531 A 1/2020

* cited by examiner

*Primary Examiner* — Edwin A. Leon
*Assistant Examiner* — Sean R Brannon
(74) *Attorney, Agent, or Firm* — Harness, Dickey & Pierce, P.L.C.

(57) ABSTRACT

A stepping motor, a driver, a current detection circuit, a first driving circuit configured to output a first driving signal to the driver, a rotation detection circuit configured to detect rotation of the rotor, and a second driving circuit configured to output a second driving signal selected from plural kinds of the second driving signals with different supply times of the driving current supplied to the coil, and configured to output a correction driving pulse that is preset to the driver when, after outputting the second driving signal, the rotation detection circuit detects that the rotor is not rotating, are included, and a resistance value R[Ω] of the coil and the driving voltage V volts of the stepping motor satisfy 900×V[Ω]≤R[Ω]≤1100×V[Ω], and 1.8 volts≤V≤2.4 volts.

5 Claims, 5 Drawing Sheets

MOVEMENT AND ELECTRONIC WATCH

The present application is based on, and claims priority from JP Application Serial Number 2020-151884, filed Sep. 10, 2020, the disclosure of which is hereby incorporated by reference herein in its entirety.

BACKGROUND

1. Technical Field

The present disclosure relates to a movement and an electronic watch.

2. Related Art

An analog electronic watch that includes a current control driving circuit and a rotation detection driving circuit as a driving circuit for driving a stepping motor for a hand, and that switches these driving circuits using a selection circuit to control these driving circuits is known (see, for example, JP-A-2020-16531).

The selection circuit selects the rotation detection driving circuit to reduce power consumption when the hands such as hour hand and minute hand are normally driven, and selects the current control driving circuit to move the hand at high speed when the hand is fast-forwarded such as when returning to zero.

When the current control driving circuit reduces the coil resistance value of the stepping motor so that as much energy as possible is input thereto at the start of driving, the current flowing through the coil becomes large and the driving speed of the motor can be increased.

On the other hand, when the coil resistance value is small, energy exceeding a predetermined value may be input during driving by the rotation detection driving circuit, and an unstable phenomenon such as the rotor rotating two steps at one time may occur.

For this reason, when the current control driving circuit and the rotation detection driving circuit are switched to drive the stepping motor, a movement and an electronic watch, that incorporate a stepping motor including a coil whose resistance value can achieve both high speed of fast-forwarding by the current control driving circuit and the stability of the operation by the rotation detection driving circuit, have been needed.

SUMMARY

A movement according to the present disclosure includes a stepping motor including a rotor and a coil, a driver configured to supply driving current, corresponding to a driving signal that is input thereto, to the coil, a current detection circuit configured to detect a value of current flowing through the coil, a first driving circuit configured to output a first driving signal to the driver based on the value of current detected by the current detection circuit, a rotation detection circuit configured to detect rotation of the rotor, and a second driving circuit configured to output a second driving signal selected from plural kinds of the second driving signals with different supply times of the driving current supplied to the coil, and configured to output a correction driving pulse that is preset to the driver when, after outputting the second driving signal, the rotation detection circuit detects that the rotor is not rotating, and a resistance value R[Ω] of the coil and driving voltage V volts of the stepping motor satisfy 900×V[Ω]≤R[Ω]≤1100×V[Ω], and 1.8 volts≤V≤2.4 volts.

An electronic watch of the present disclosure includes the above-described movement.

DESCRIPTION OF EXEMPLARY EMBODIMENTS

Figure 1:
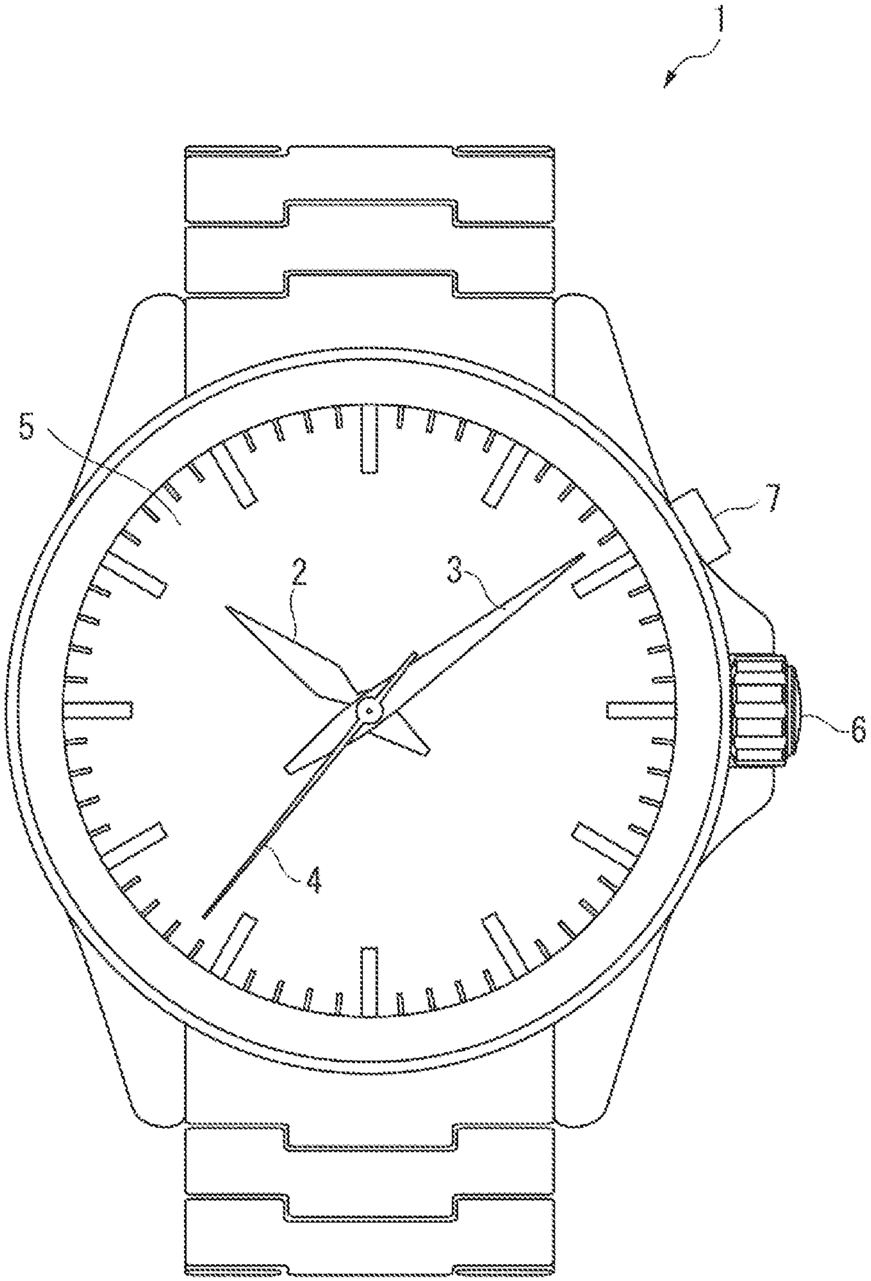
FIG. 1 is a front view illustrating an electronic watch according to an exemplary embodiment.

As illustrated in FIG. 1, an electronic watch 1 is a three-hand analog electronic watch including an hour hand 2, a minute hand 3, a seconds hand 4, a dial 5, a crown 6, and a button 7. Further, the electronic watch 1 is a radio wave correction watch that incorporates an antenna that receives standard radio waves and satellite signals transmitted from GPS (Global Positioning System) satellite, and corrects the time indicated by the hour hand 2, the minute hand 3, and the seconds hand 4 based on the received signals.

The electronic watch 1 includes a movement 10 that includes a stepping motor 40 for time display, which drives the hour hand 2, the minute hand 3, and the seconds hand 4, and a train wheel (not illustrated).

Figure 2:
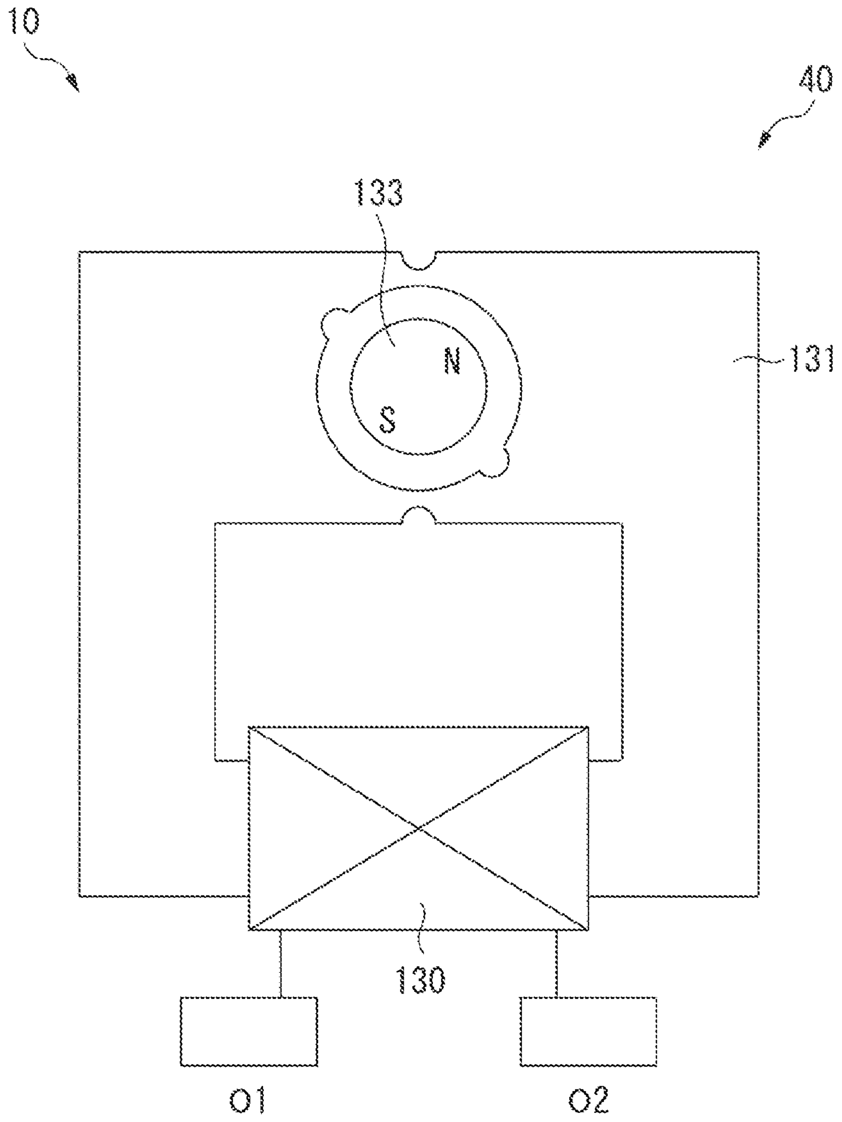
FIG. 2 is a diagram illustrating a configuration of a stepping motor according to the exemplary embodiment.

As illustrated in FIG. 2, the stepping motor 40 provided at the movement 10 includes a stator 131, a coil 130, and a rotor 133. Both ends of the coil 130 are conducted to output terminals O1 and O2 of a driver 51, which will be described later, and the rotor 133 is a magnet that is magnetized to two poles in the radial direction. Therefore, the stepping motor 40 is a bipolar single-phase stepping motor used for an electronic watch, and is driven by a driving signal input to the driver 51, as described below.

Note that one or a plurality of stepping motors 40 for time display may be provided. This stepping motor is controlled by a motor driving circuit 20 illustrated in FIG. 3, and is controlled by switching the normal drive and fast-forward drive according to each function.

Figure 3:
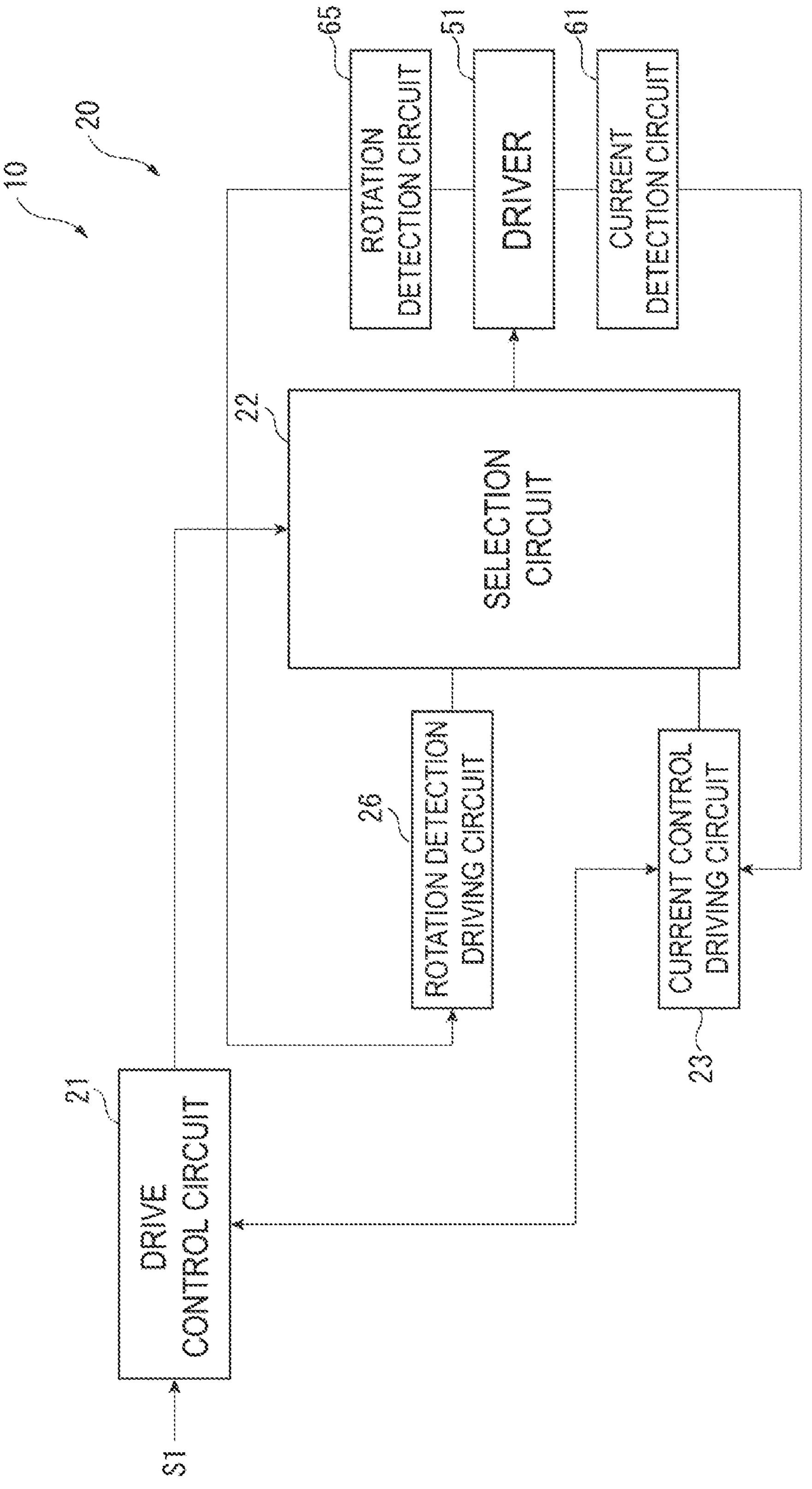
FIG. 3 is a block diagram illustrating a configuration of a movement according to the exemplary embodiment.

The motor driving circuit 20 provided at the movement 10 is constituted by a semiconductor device such as an integrated circuit (Integrated Circuit), and as illustrated in FIG. 3, the motor driving circuit 20 includes a drive control circuit 21, a selection circuit 22, a current control driving circuit 23, a rotation detection driving circuit 26, the driver 51, a current detection circuit 61, and a rotation detection circuit 65. In the motor driving circuit 20, the current control driving circuit 23 is a first driving circuit, the rotation detection driving circuit 26 is a second driving circuit, and the drive control circuit 21 and the selection circuit 22 are control measures.

A signal S1 is input to the drive control circuit 21 from the outside. The signal S1 is output from a CPU or the like of the electronic watch 1, and includes a mode signal that switches between a normal hand movement mode for performing normal hand movement and a correction mode for performing time correction, data capable of setting the hand movement amount at the time of time correction, for example, time data indicated by the hand and current time data after the correction, and the like.

The drive control circuit 21 controls the selection circuit 22 by the mode signal of the signal S1 input from the outside. That is, the drive control circuit 21 controls the selection circuit 22 so that the driving signal output from the rotation detection driving circuit 26 is input to the driver 51 in the normal hand movement mode.

Further, the drive control circuit 21 controls the selection circuit 22 so that the driving signal output from the current control driving circuit 23 is input to the driver 51, in the correction mode such as when the button 7 is pressed and the radio wave receiving process is performed and the current time is acquired. Furthermore, in the correction mode, the drive control circuit 21 outputs a control signal for time correction to the current control driving circuit 23. That is, the drive control circuit 21 calculates the number of driving steps of the stepping motor 40 required to move the hour hand 2, the minute hand 3, and the seconds hand 4 to positions indicating the current time, and outputs the number of the driving steps to the current control driving circuit 23.

The selection circuit 22 reads the signal from the driving circuit selected from the current control driving circuit 23 and the rotation detection driving circuit 26 and outputs the signal to the driver 51, and controls the stepping motor 40 based on the driving signal output from the driving circuit selected from the current control driving circuit 23 and the rotation detection driving circuit 26.

Figure 4:
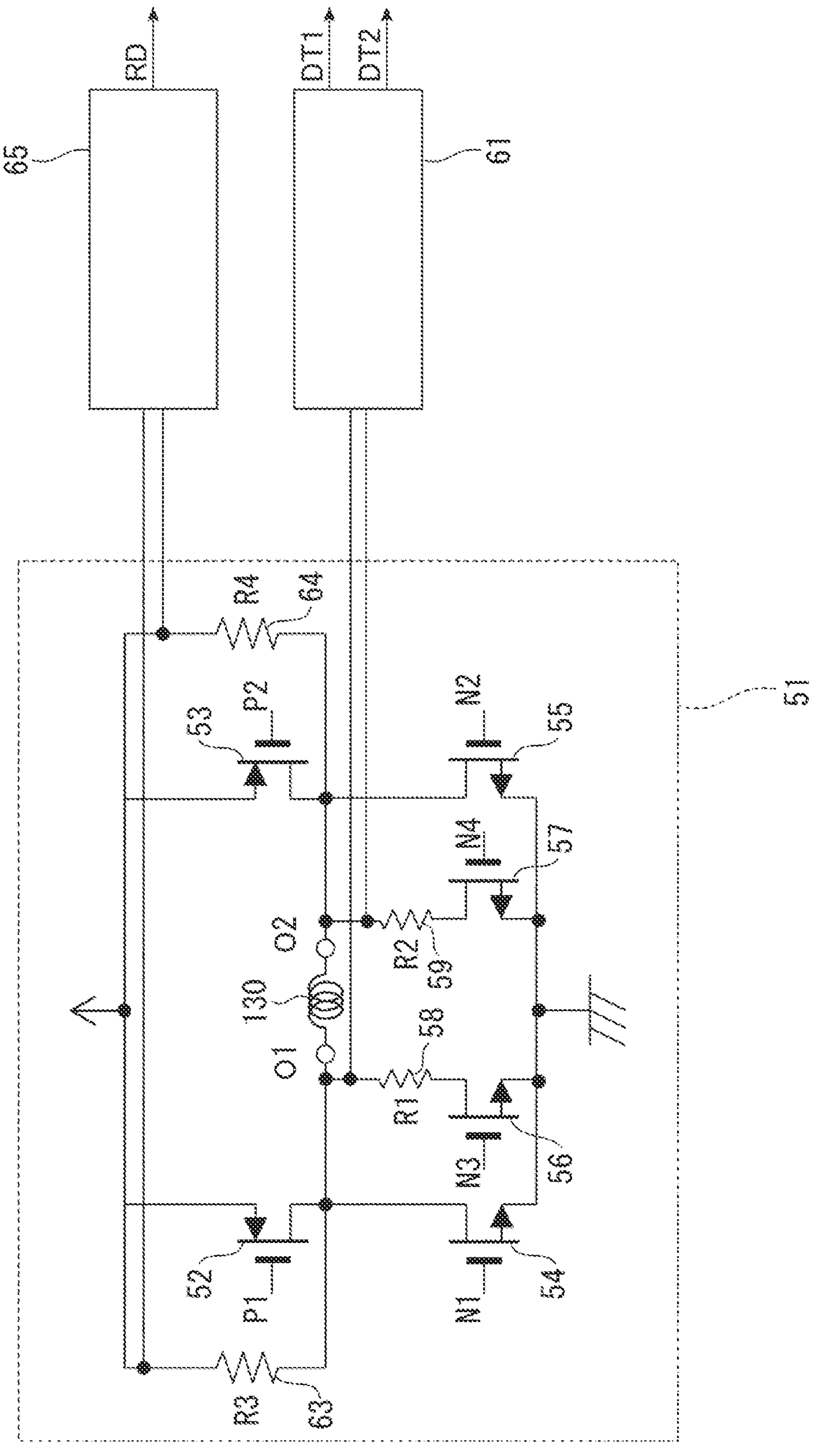
FIG. 4 is a circuit diagram illustrating a driver according to the exemplary embodiment.

As illustrated in FIG. 4, the driver 51 includes two Pch transistors 52 and 53, four Nch transistors 54, 55, 56, and 57, and four detection resistors 58, 59, 63, and 64. Each transistor 52 to 57 is controlled by gate signals P1, P2, N1, N2, N3, and N4 output from the current control driving circuit 23 or the rotation detection driving circuit 26 via the selection circuit 22, and supplies current to the coil 130 of the motor in both positive direction and negative direction.

The current control driving circuit 23 is a circuit that controls the driving signal based on a value of current flowing through the coil 130 of the stepping motor 40 detected by the current detection circuit 61.

The current control driving circuit 23 outputs a first driving signal to the driver 51 via the selection circuit 22. The driver 51 supplies driving current to the coil 130 of the motor.

The current detection circuit 61 detects the value of current flowing through the coil 130. In the present embodiment, by comparing the voltage generated at both ends of detection resistors 58 and 59 of resistance values R1 and R2, a first reference voltage, and a second reference voltage, the current detection circuit 61 detects whether or not the value of current flowing through the coil 130 is within a range equal to or greater than a first value of current which is the lower limit value of current, and less than a second value of current which is the upper limit value of current. The current detection circuit 61 can be configured by, for example, a circuit including a reference voltage generation source, a comparator, and the like.

The current detection circuit 61 outputs an output DT1 and an output DT2 as a result of the detection. The output DT1 becomes H level when the value of current flowing through the coil 130 is equal to or more than the first value of current, and becomes L level when the value of current flowing through the coil 130 is less than the first value of current. The output DT2 becomes H level when the value of current flowing through the coil 130 is equal to or more than the second value of current, and becomes L level when the value of current flowing through the coil 130 is less than the second value of current.

The current control driving circuit 23 maintains the value of current flowing through the coil 130 in a range from the first value of current which is the lower limit value of current to the second value of current which is the upper limit value of current, and when a predetermined polarity reversal condition is satisfied, the current control driving circuit 23 reverses the direction of the current flowing through the 130 and drives and controls the stepping motor 40 at high speed.

For example, after turning on the driver 51 to drive the stepping motor 40, the current control driving circuit 23 refers to the output DT2, and when detecting that the value of current is equal to or greater than the second value of current which is the upper limit value of current, the current control driving circuit 23 turns off the driver 51. After turning off the driver 51, the current control driving circuit 23 refers to the output DT1, and when detecting that the value of current is less than the first value of current which is the lower limit value of current, the current control driving circuit 23 turns on the driver 51. As a result, the current control driving circuit 23 maintains the value of current flowing through the coil 130 between the first value of current and the second value of current, that is, at a substantially constant value of current.

Then, when the polarity reversal condition is satisfied, for example, when the duration of turning off the driver 51 exceeds a threshold value, the current control driving circuit 23 controls the gate signals P1, P2, N1, N2, N3, and N4 and reverse the direction of the current flowing through the coil 130.

Each time the current control driving circuit 23 reverses the direction of the current flowing through the coil 130, the current control driving circuit 23 subtracts 1 from the number of driving steps input from the drive control circuit 21, and when the number of the driving steps becomes 0 and the hour hand 2, the minute hand 3 and the seconds hand 4 indicate the current time, the current control driving circuit 23 ends the driving by the current control driving circuit 23 and notifies the drive control circuit 21.

When receiving the notification of the end of the driving by the current control driving circuit 23, the drive control circuit 21 controls the selection circuit 22 to switch to the normal hand movement drive by the rotation detection driving circuit 26.

The rotation detection driving circuit 26 is a circuit that performs pulse width controlling drive that controls pulse width of a motor driving pulse based on the result of the rotation of the rotor 133 detected by the rotation detection circuit 65, and achieves energy saving by controlling the pulse width of the motor driving pulse to minimum that can rotate the rotor 133.

That is, the rotation detection driving circuit 26 outputs the motor driving pulse, which is the second driving signal, to the driver 51, and then outputs a detection pulse.

The rotation detection circuit 65 detects the magnitude of induced voltage by the detection pulse that is output after a predetermined mask time has elapsed from the output of the motor driving pulse. Then, the rotation detection circuit 65 detects whether or not the rotor 133 has rotated according to the number of detection pulses whose induced voltage exceeds a predetermined threshold value, and outputs an output RD as a detection result. For example, the output RD becomes H level when the rotation of the rotor 133 is detected, and becomes L level when the non-rotation of the rotor 133 is detected.

When the output RD becomes L level and the rotation detection circuit 65 detects that the rotor 133 is not rotating, the rotation detection driving circuit 26 outputs a correction driving pulse capable of reliably rotating the rotor 133.

The motor driving pulse, which is the second driving signal, is a comb-shaped chopping pulse. Further, when the rotor 133 is continuously rotated a predetermined number of times by the motor driving pulse, the rotation detection driving circuit 26 reduces the number of teeth or the duty of the motor driving pulse to be output to the driver 51 next, thereby reducing the energy input to the coil 130.

On the other hand, when the rotor 133 does not rotate by the motor driving pulse and the rotation detection driving circuit 26 outputs the correction driving pulse, the rotation detection driving circuit 26 increases the number of the teeth or the duty of the motor driving pulse to be output to the driver 51 next, thereby increasing the energy input to the coil 130.

That is, the rotation detection driving circuit 26, which is the second driving circuit, is configured to output the second driving signal, selected from plural kinds of the second driving signal with different supply times of the driving current supplied to the coil 130, the supply times depending on the number of teeth and the duty of the motor driving pulse, to the driver 51. When the result of the rotation detection of the rotor 133 by the rotation detection circuit 65 meets a predetermined condition, for example, when the rotor 133 continuously rotates a predetermined number of times or when the rotor 133 does not rotate and the rotation detection driving circuit 26 outputs the correction driving pulse, the rotation detection driving circuit 26 selects different second driving signal from plural kinds of the second driving signal.

As described above, in the normal hand movement by the rotation detection driving circuit 26, the energy input to the coil 130 by the motor driving pulse can be minimized, and power saving can be realized.

Coil of Stepping Motor

The resistance value R[Ω] of the coil 130 of the stepping motor 40 and the driving voltage V volts of the stepping motor are set to satisfy 900×V[Ω]≤R[Ω]≤1100×V[Ω], and 1.8 volts≤V≤2.4 volts. These conditions are set based on experimental results, as described below.

The first experiment examined the relationship between the driving voltage and the resistance value of the coil 130, and the driving stability, when the driving control of the stepping motor 40 was performed by the rotation detection driving circuit 26. The results of the first experiment are illustrated in FIG. 5.

Figure 5:
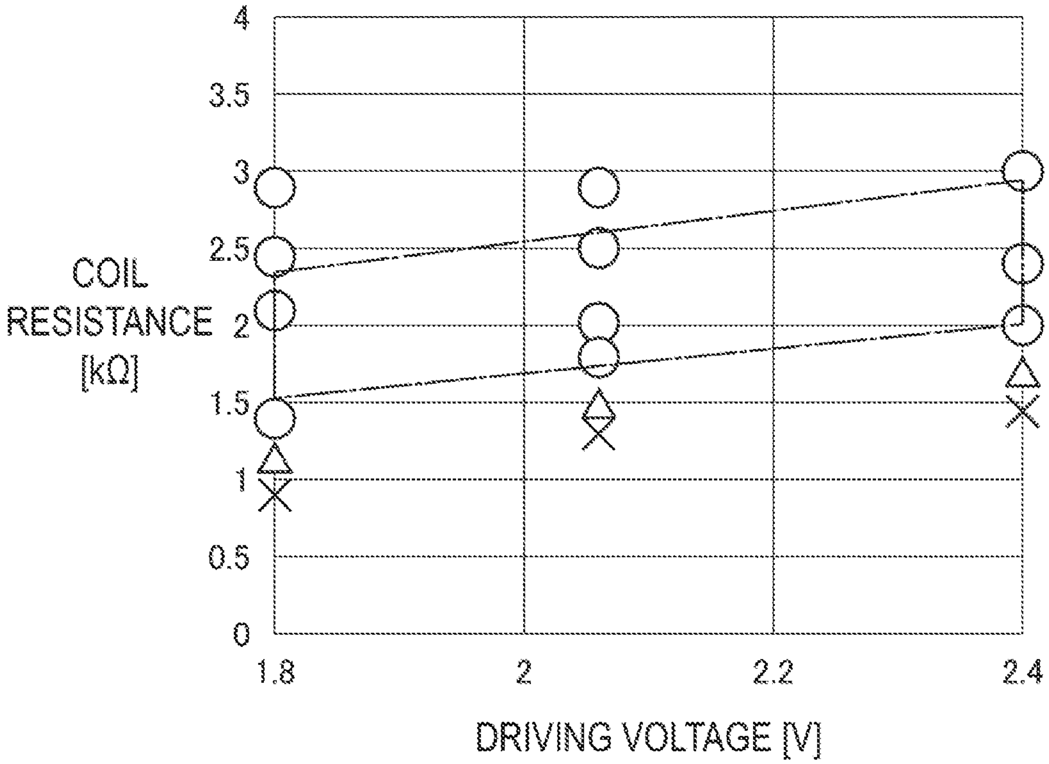
FIG. 5 is a graph illustrating a relationship between a coil resistance value and driving voltage.

In FIG. 5, "GOOD (represented by a mark '○')" indicates that the stepping motor 40 has been stably driven. Note that the stepping motor 40 is stably driven means a state where there is a region in which the rotor 133 is sufficiently rotated within the range of the motor driving pulse set by the rotation detection driving circuit 26 and variation thereof, and normal rotation can be determined when the rotor 133 is rotating and no rotation can be reliably determined when the rotor 133 is not rotating.

In FIG. 5, "FAIR (represented by a mark 'Δ')" indicates that the driving is unstable, for example, the rotor 133 is rotated for two steps and became unstable. "POOR (represented by a mark 'X')" indicates that the rotation detection circuit 65 could not detect the rotation because the rotor 133 moved too fast.

As illustrated in FIG. 5, it can be understood that when the resistance value of the coil 130 becomes small, the rotation of the rotor 133 becomes unstable or the rotation cannot be detected during the driving control by the rotation detection driving circuit 26, so that stable drive cannot be achieved. Therefore, it has been found that the resistance value R of the coil 130 needs to be set to 900 V[Ω] or more, when the driving voltage of the stepping motor 40 is V.

The second experiment examined the relationship between the driving voltage and the resistance value of the coil 130, and the driving velocity, when the driving control of the stepping motor 40 was performed by the current control driving circuit 23.

In general, when the resistance value R of the coil 130 of the stepping motor 40 increases, the driving current flowing through the coil 130 becomes small, and thus the fast-forward speed becomes slow during the driving control of the stepping motor 40 by the current control driving circuit 23. That is, in the driving control of the stepping motor 40 by the current control driving circuit 23, the higher the driving voltage and the lower the resistance value R of the coil 130, the higher the driving speed of the stepping motor 40 can be. Therefore, as a result of performing an experiment of driving the stepping motor 40 by the current control driving circuit 23 as a second experiment, it has been found that, in order to move the rotor 133 at several hundred Hz, for example, approximately 300 Hz, the resistance value R of the coil 130 needs to be set to 1100 V[Ω] or less when the driving voltage of the stepping motor 40 is V.

Further, the driving voltage V of the stepping motor 40 is set to from 1.8 volts to 2.4 volts for the following reasons. That is, when the driving voltage is less than 1.8 volts, especially in the current control driving circuit 23, the power supplied to the coil 130 becomes small, and thus it becomes difficult to drive the stepping motor 40 at high speed.

Further, when the driving voltage is greater than 2.4 volts, especially in the rotation detection driving circuit 26, the energy input to the coil 130 may become too high, and thus the rotor 133 becomes more likely to rotate for two steps. Further, when the driving voltage is high, the duration of the electronic watch 1 such as a wristwatch, which has a primary battery or a secondary battery as a power source, is shortened.

From the above points, it can be understood that when the current control driving circuit 23 and the rotation detection driving circuit 26 are switched to drive one stepping motor 40, the driving voltage V of the stepping motor 40 needs to be set to 1.8 volts≤V≤2.4 volts, and the resistance value R of the coil 130 of the stepping motor 40 needs to be set to 900×V[Ω]≤R[Ω]≤1100×V[Ω].

Furthermore, when the resistance value R of the coil 130 of the stepping motor 40 is set to a low range of 900×V[Ω]≤R[Ω]≤1000×V[Ω], it is possible to realize further high speed of fast-forwarding in the current control driving circuit 23 while maintaining the stability of the operation in the rotation detection driving circuit 26.

Effects of Exemplary Embodiment

According to the movement 10 of the present embodiment, the resistance value R[Ω] of the coil 130 of the stepping motor 40 and the driving voltage V volts of the stepping motor are set to satisfy 900×V[Ω]≤R[Ω]≤1100×V[Ω], and 1.8 volts≤V≤2.4 volts. Therefore, when the current control driving circuit 23 and the rotation detection driving circuit 26 are switched to drive and control the stepping motor 40, it is possible to achieve both high speed of fast-forwarding in the current control driving circuit 23 and the stability of the operation in the rotation detection driving circuit 26.

Since the drive control circuit 21 drives the stepping motor 40 using the rotation detection driving circuit 26 when performing normal hand movement control of the hour hand 2, the minute hand 3, and the seconds hand 4, it is possible to reliably drive the stepping motor 40 and also to reduce power consumption.

On the other hand, when correcting the time display by receiving radio waves or the like, since the motor driving control by the current control driving circuit 23 is used, the hour hand 2, the minute hand 3, and the seconds hand 4 can be fast-forwarded at high speed, and thus the display can be switched in a short time.

Other Exemplary Embodiments

Note that the present disclosure is not limited to each of the embodiments described above, and variations, modifications, and the like within the scope in which the object of the present disclosure can be achieved are included in the present disclosure.

In the above-described embodiment, the resistance value R[Ω] of the coil 130 is set to satisfy 900 V×[Ω]≤R[Ω]≤1100×V[Ω], but the resistance value R[Ω] of the coil 130 may be set to satisfy 900×V[Ω]≤R[Ω]≤1000×V[Ω]. That is, when the upper limit of the resistance value of the coil 130 is suppressed to 1000 V[Ω], it is possible to realize further high speed of fast-forwarding in the current control driving circuit 23, for example, high speed of approximately 400 Hz can be achieved, while maintaining the stability of the operation in the rotation detection driving circuit 26.

The electronic watch 1 is not limited to a watch that fast-forwards and corrects the hands to the current time indication by receiving radio waves as in the above-described embodiment, and may be a connected watch that can communicate with a smart phone. In the case of the connected watch, the stepping motor 40 may be driven using the rotation detection driving circuit 26 during normal hand movement of the hands which indicates the time, and the stepping motor 40 may be driven using the current control driving circuit 23 to fast-forward the hands in order to indicate various information. For example, when the display to which functions of the connected watch is switched is performed by the hour hand 2, the display can be switched in a short time by driving the stepping motor 40 using the current control driving circuit 23 which is the first driving circuit. Further, by using the rotation detection driving circuit 26 which is the second driving circuit and driving the stepping motor 40 at intervals of, for example, five minutes, the hour hand 2 can be moved intermittently to indicate the normal time.

SUMMARY OF THE PRESENT DISCLOSURE

A movement according to the present disclosure includes a stepping motor including a rotor and a coil, a driver configured to supply driving current, corresponding to a driving signal that is input thereto, to the coil, a current detection circuit configured to detect a value of current flowing through the coil, a first driving circuit configured to output a first driving signal to the driver based on the value of current detected by the current detection circuit, a rotation detection circuit configured to detect rotation of the rotor, and a second driving circuit configured to output a second driving signal selected from a plurality of types of second driving signals having different supply times of the driving current supplied to the coil, and configured to output a preset correction driving pulse to the driver when, after outputting the second driving signal, the rotation detection circuit detects that the rotor is not rotating, and a resistance value R[Ω] of the coil and driving voltage V volts of the stepping motor satisfy 900×V[Ω]≤R[Ω]≤1100×V[Ω], and 1.8 volts≤V≤2.4 volts.

According to the movement of the present disclosure, when the first driving circuit and the second driving circuit are switched to drive and control the stepping motor, both high speed of fast-forwarding by the first driving circuit and the stability of the operation by the second driving circuit can be achieved.

In the movement of the present disclosure, the resistance value R[Ω] of the coil satisfies 900×V[Ω]≤R[Ω]≤1000×V [Q].

According to the movement of the present disclosure, further high speed of fast-forwarding by the first driving circuit, while maintaining the stability of the operation by the second driving circuit can be realized.

An electronic watch of the present disclosure includes the above-described movement.

According to the electronic watch of the present disclosure, both high speed of fast-forwarding by the first driving circuit and the stability of the operation by the second driving circuit can be achieved.

What is claimed is:

1. A movement comprising:

a stepping motor including a rotor and a coil, a driver configured to supply driving current, corresponding to a driving signal that is input thereto, to the coil, a current detection circuit configured to detect a value of current flowing through the coil, a first driving circuit configured to output a first driving signal to the driver based on the value of current detected by the current detection circuit, a rotation detection circuit configured to detect rotation of the rotor, and a second driving circuit configured to output:

a plurality of second driving signals having different driving current supply periods of time to the driver;

a first one of the plurality of second driving signals having a first driving current supply period of time to the driver when the rotation detection circuit detects the rotations of the rotor a plurality of consecutive times;

a predetermined correction driving pulse to the driver when, after outputting one of the plurality of second driving signals, the rotation detection circuit detects that the rotor is not rotating; and a second one of the plurality of second driving signals having a second driving current supply period of time to the driver after outputting the predetermined correction driving pulse, the second driving current supply period of time being longer than the first driving current supply period of time, wherein 900×V≤R≤1100×V, and 1.8 volts≤V≤2.4 volts, where R is a resistance value of the coil, measured in ohms, and V is a driving voltage of the stepping motor, measured in volts, and the first driving circuit drives the rotor at a velocity from 300 Hz to 400 Hz.

2. The movement according to claim 1, wherein $$900\times V\leq R\leq 1000\times V.$$

3. The movement according to claim 1 comprising:

a hand driven by the stepping motor, wherein the hand is driven by the second driving circuit during normal hand movement for displaying a time, and the hand is driven by the first driving circuit when the hand is fast-forwarded.

4. An electronic watch comprising the movement according to claim 1.

5. A movement comprising:

a stepping motor including a rotor and a coil, a driver configured to supply driving current, corresponding to a driving signal that is input thereto, to the coil, a current detection circuit configured to detect a value of current flowing through the coil, a first driving circuit configured to output a first driving signal to the driver based on the value of current detected by the current detection circuit, a rotation detection circuit configured to detect rotation of the rotor, and a second driving circuit configured to output a second driving signal selected from plural kinds of the second driving signals with different supply times of the driving current supplied to the coil, and configured to output a correction driving pulse that is preset to the driver when, after outputting the second driving signal, the rotation detection circuit detects that the rotor is not rotating, wherein $900\times V \leq R \leq 1100\times V$, and 1.8 volts$\leq V \leq$2.4 volts, where R is a resistance value of the coil, measured in ohms, and V is a driving voltage of the stepping motor, measured in volts, and the first driving circuit drives the rotor at a velocity from 300 Hz to 400 Hz.

* * * * *